US012567393B2

(12) United States Patent
Sato et al.

(10) Patent No.: US 12,567,393 B2
(45) Date of Patent: Mar. 3, 2026

(54) NUT FOR MUSICAL INSTRUMENT

(71) Applicant: YAMAHA CORPORATION, Hamamatsu (JP)

(72) Inventors: Hiromu Sato, Hamamatsu (JP); Yuki Uchida, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 253 days.

(21) Appl. No.: 18/514,245

(22) Filed: Nov. 20, 2023

(65) Prior Publication Data

US 2024/0169959 A1 May 23, 2024

(30) Foreign Application Priority Data

Nov. 22, 2022 (JP) ................................ 2022-186189
Jun. 6, 2023 (JP) ................................ 2023-093042

(51) Int. Cl.
*G10D 13/10* (2020.01)

(52) U.S. Cl.
CPC .................................... *G10D 13/28* (2020.02)

(58) Field of Classification Search
CPC ...... G10D 13/10; G10D 13/063; G10D 13/00; G10D 9/00; F16B 2/06
See application file for complete search history.

(56) References Cited

U.S. PATENT DOCUMENTS

| | | | | |
|---|---|---|---|---|
| 6,935,628 | B1 * | 8/2005 | Conversa ................ | B25B 5/163 269/166 |
| 7,629,526 | B1 | 12/2009 | Miyajima | |
| 8,471,133 | B1 | 6/2013 | Lin | |
| 8,974,138 | B2 | 3/2015 | Liao | |
| 11,170,745 | B1 | 11/2021 | Cabo | |
| 2018/0313383 | A1 | 11/2018 | Kadosh | |

OTHER PUBLICATIONS

Extended European search report issued in European Appln. No. 23210929.8, mailed on Mar. 21, 2024.
Communication Pursuant to Article 94(3) EPC issued in European Appln. No. 23210929.8 mailed May 27, 2025.

* cited by examiner

*Primary Examiner* — Kimberly R Lockett
(74) *Attorney, Agent, or Firm* — ROSSI, KIMMS & McDOWELL LLP

(57) ABSTRACT

A nut for a musical instrument includes: a clamp jaw having an opening through which a stand is passable, the clamp jaw being configured to, in a state of the stand being disposed in the opening, change a size of the opening by changing a position of the clamp jaw between an open position and a closed position; an elastic member configured to, in a state of the clamp jaw being in the closed position, clamp the clamp jaw to the stand by exerting a force directly on the clamp jaw; an operating element having a pressing portion and a front end portion; and a housing accommodating the clamp jaw, the elastic member, and the operating element.

7 Claims, 11 Drawing Sheets

NUT FOR MUSICAL INSTRUMENT

CROSS-REFERENCE TO RELATED APPLICATIONS

The present application claims priority to Japanese Patent Application No. 2022-186189, filed Nov. 22, 2022 and Japanese Patent Application No. 2023-093042, filed Jun. 6, 2023. The contents of these applications are incorporated herein by reference.

BACKGROUND OF THE INVENTION

Field of the Invention

The present disclosure relates to a nut for a musical instrument.

Description of Related Art

U.S. Pat. No. 11,170,745 (hereinafter Patent Document 1) discloses a quick-release clamp (nut for a musical instrument) for easily attaching a musical instrument to a stand. The quick-release clamp includes an opening through which a stand is passed, a clamp jaw that changes the size of the opening between a closed position and an open position in a state where the stand is passed through the opening, an operating element for changing the position of the clamp jaw, a housing inside which the opening, the clamp jaw, and the operating element are arranged, and an elastic member provided between the operating element and the housing.

In the quick-release clamp, the operating element holds the clamp jaw in the closed position as a result of being pressed by the force of the elastic member and being held in a predetermined position. Furthermore, the clamp jaw is moved from the closed position to the open position as a result of the operating element being operated against the force of the elastic member. The quick-release clamp is attached to the stand as a result of the clamp jaw being held in the closed position. Moreover, the attached state of the quick-release clamp to the stand is released as a result of moving the clamp jaw to the open position.

SUMMARY OF THE INVENTION

However, in the quick-release clamp of Patent Document 1, the clamp jaw is only held in the closed position by the operating element, and is not pressed against the stand in the closed position. This can cause the quick-release clamp to move with respect to the stand and become detached from the stand. For example, in a state where the clamp jaw is held in the closed position by the operating element, the quick-release clamp can rotate with respect to the stand and become detached even though the female thread of the clamp jaw and the male thread of the stand are engaged.

The present disclosure has been made in view of the circumstances described above. An object of the present disclosure is to provide a nut for a musical instrument that prevents accidental detachment from a stand, while also including a mechanism that holds a clamp jaw in a closed position by means of an operating element.

According to an aspect of the present disclosure, a nut for a musical instrument, includes: a clamp jaw having an opening through which a stand is passable, the clamp jaw being configured to, in a state of the stand being disposed in the opening, change a size of the opening by changing a position of the clamp jaw between an open position and a closed position; an elastic member configured to, in a state of the clamp jaw being in the closed position, clamp the clamp jaw to the stand by exerting a force directly on the clamp jaw; an operating element having a pressing portion and a front end portion; and a housing accommodating the clamp jaw, the elastic member, and the operating element. In the state of the clamp jaw being in the closed position, the front end portion of the operating element hinders the clamp jaw from moving to the open position by contacting the clamp jaw and the housing. In a state of the clamp jaw being in the open position, the front end portion of the operating element presses the elastic member such that the elastic member does not exert the force directly on the clamp jaw and the pressing portion of the operating element presses and spreads the clamp jaw open.

DETAILED DESCRIPTION OF THE INVENTION

First Embodiment

Hereunder, a first embodiment of the present disclosure will be described with reference to FIGS. 1 to 6.

Figure 1:
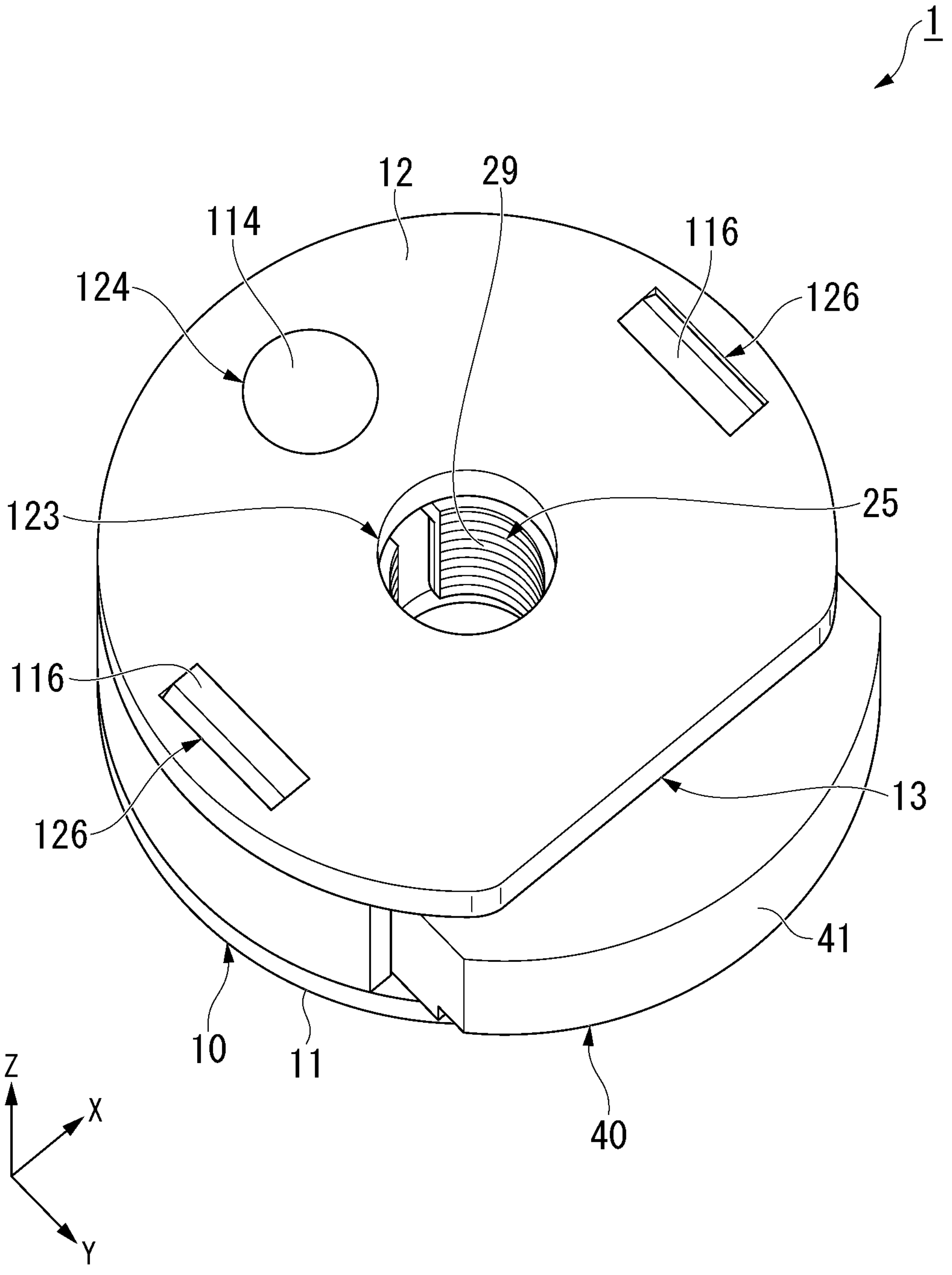
FIG. 1 is an external view showing a nut for a musical instrument of a first embodiment of the present disclosure.
Figure 2:
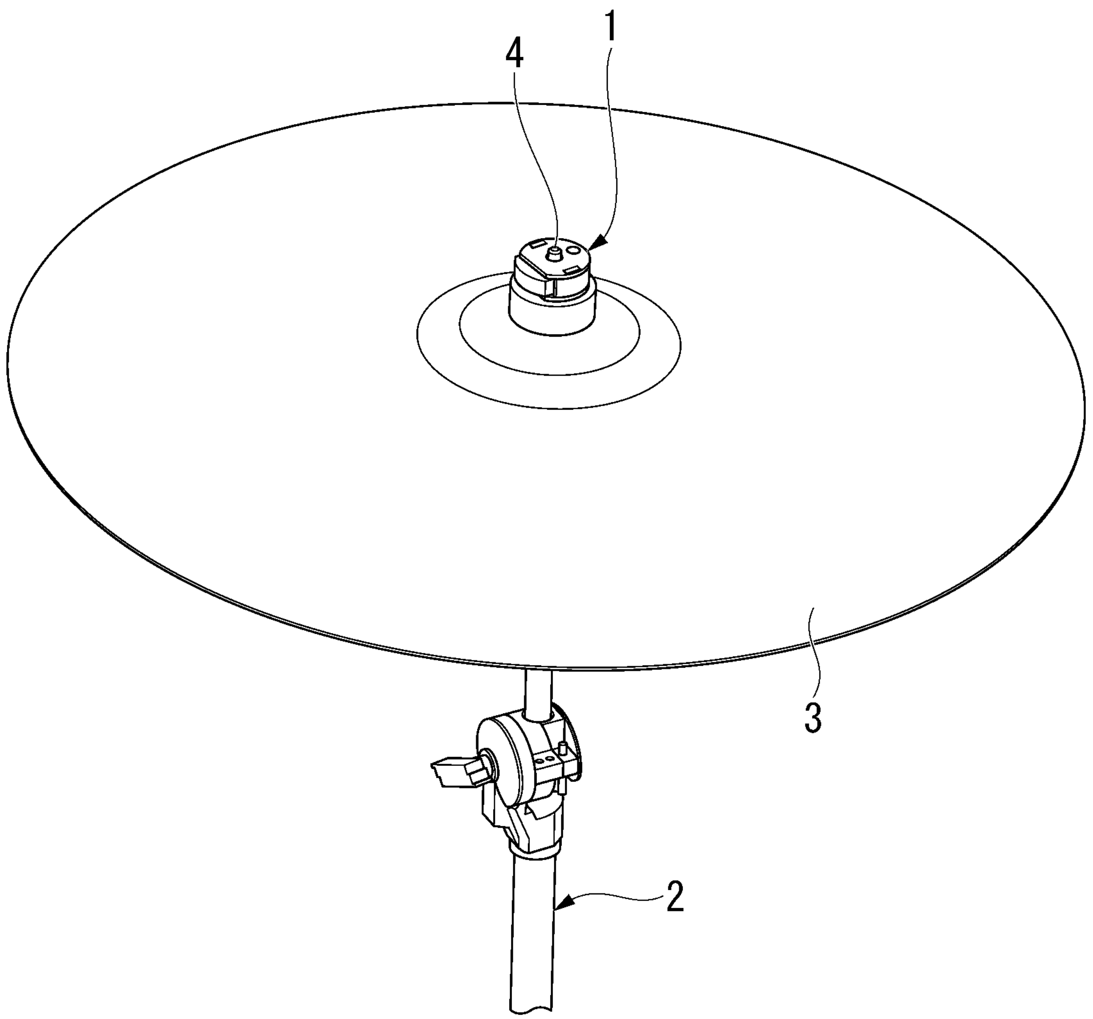
FIG. 2 is a perspective view showing an example of using the nut for a musical instrument in FIG. 1.

As shown in FIG. 1, a nut 1 for a musical instrument includes a female thread 29. The nut 1 for a musical instrument, for example as shown in FIG. 2, is attached to a stand 2 to hold a cymbal 3, which is an example of a musical instrument, on the stand 2. Specifically, the nut 1 for a musical instrument is inserted through a front end portion 4 of the stand 2, and the female thread 29 of the nut 1 for a musical instrument (see FIG. 1) is engaged with a male thread formed on the front end portion 4 of the stand 2. As a result, the nut 1 for a musical instrument is attached to the stand 2, and the cymbal 3 can be held on the stand 2 by the nut 1 for a musical instrument.

As shown in FIG. 1 and FIG. 3 to FIG. 6, the nut 1 for a musical instrument includes a housing 10, a clamp jaw 20, an elastic member 30, and an operating element 40.

The clamp jaw 20, the elastic member 30, and the operating element 40 are provided inside the housing 10. The housing 10 includes a housing body 11 and a lid 12.

The housing body 11 is formed in a box shape that is open in one direction (the positive Z-axis direction in FIG. 1 and FIG. 3 to FIG. 6). As a result, the housing body 11 has a space that is capable of accommodating the clamp jaw 20, the elastic member 30, and the operating element 40. As shown in FIG. 3 to FIG. 6, the housing body 11 has a bottom plate portion 111 with one direction as the plate thickness direction, and a side wall portion 112 that extends in the one direction around the periphery of the bottom plate portion 111. The clamp jaw 20, the elastic member 30, and the operating element 40 are accommodated in the space surrounded by the bottom plate portion 111 and the side wall portion 112.

The bottom plate portion 111 has a through hole 113 for inserting the front end portion 4 of the stand 2 (see FIG. 2) through the housing 10. The bottom plate portion 111 is provided with a rotation shaft 114 that protrudes in the one direction toward the inside of the housing body 11. The rotation shaft 114 rotatably supports a first part 210 and a second part 220 of the clamp jaw 20 described below.

A notch is formed in a portion of the side wall portion 112 in the circumferential direction. The notch in the side wall portion 112 constitutes an opening 13 of the housing 10 for exposing a portion of the operating element 40 accommodated in the housing 10 to the outside. The opening 13 of the housing 10 faces in a first orthogonal direction (the Y-axis direction in FIG. 1 and FIG. 3 to FIG. 6), which is orthogonal to the one direction.

The inner surface of the side wall portion 112 includes two support surfaces 115 that support the operating element 40. The two support surfaces 115 each extend in the first orthogonal direction. The two support surfaces 115 face each other in a second orthogonal direction (the X-axis direction in FIG. 1 and FIG. 3 to FIG. 6), which is orthogonal to both the one direction and the first orthogonal direction.

The front end portion of the side wall portion 112 that extends from the bottom plate portion 111 is provided with claw portions 116. The claw portions 116 function as engaging portions that causes the lid 12 described below to be engaged with the housing body 11.

Figure 3:
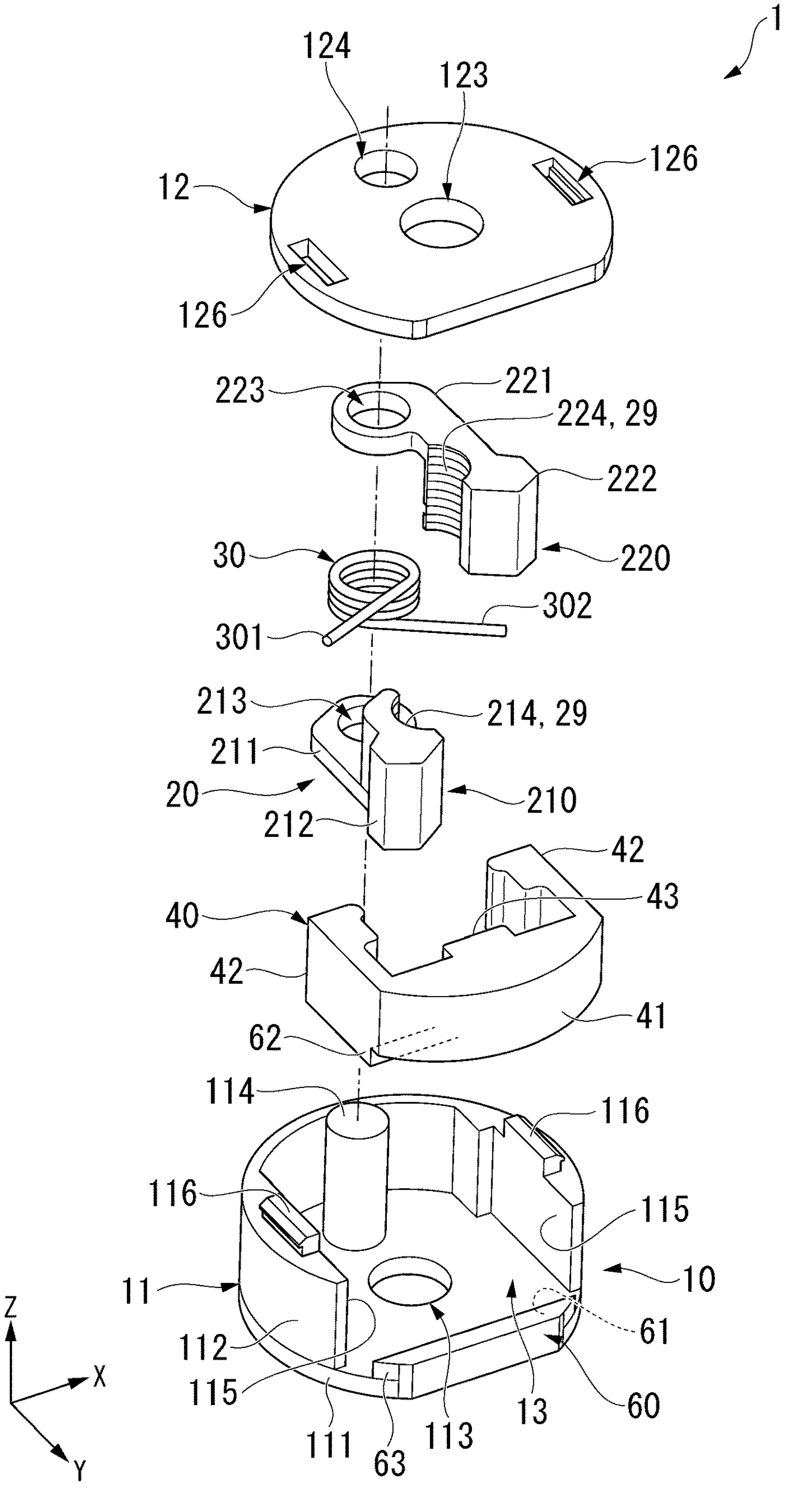
FIG. 3 is an exploded perspective view of the nut for a musical instrument in FIG. 1.

As shown in FIG. 1 and FIG. 3, the lid 12 of the housing 10 covers the opening on the one direction side of the housing body 11. The lid 12 has a through hole 123 for inserting the front end portion 4 of the stand 2 through the housing 10. Furthermore, the lid 12 has an insertion hole 124 into which the rotation shaft 114 of the housing body 11 is inserted. Although the insertion hole 124 in the illustrated example penetrates through the lid 12, for example, it may be a bottomed hole that does not penetrate through the lid 12. In addition, the lid 12 includes engaged portions 126 with which the claw portions 116 of the housing body 11 are engaged. The lid 12 is held on the housing body 11 as a result of the engaged portions 126 engaging with the claw portions 116 of the housing body 11.

Figure 4:
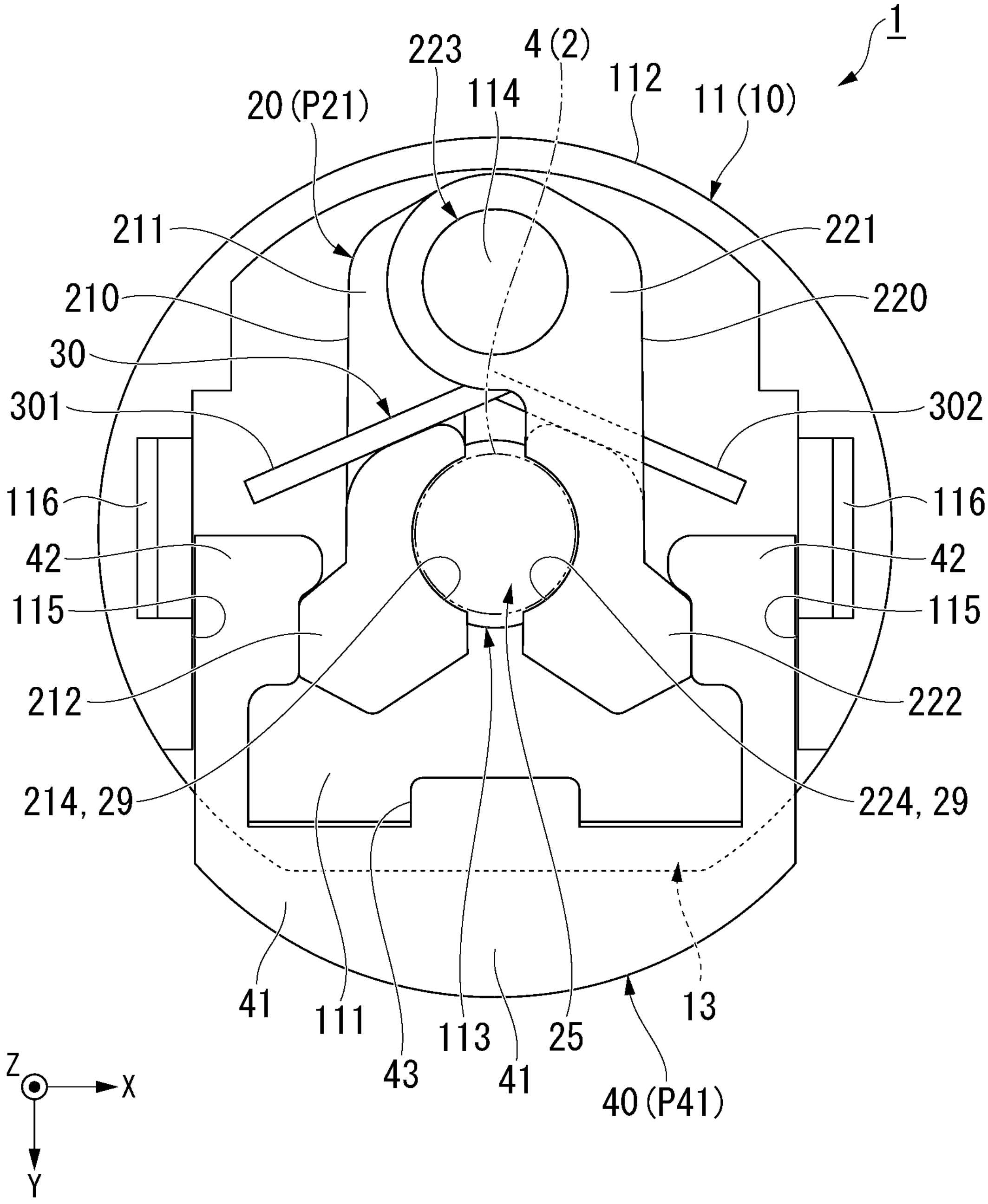
FIG. 4 is a plan view showing a state where the clamp jaw of the nut for a musical instrument in FIG. 1 is arranged in a closed position.
Figure 5:
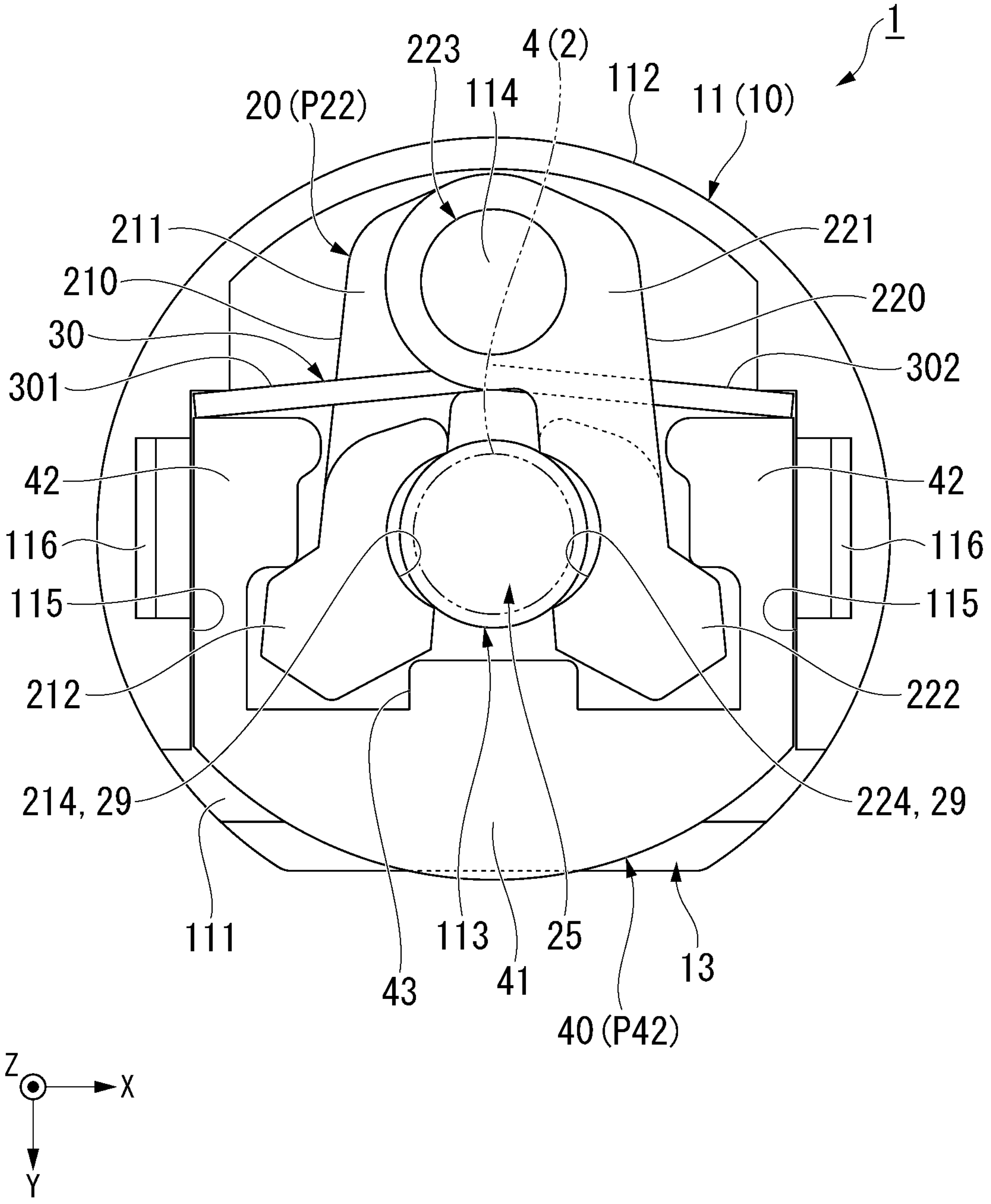
FIG. 5 is a plan view showing a state where the clamp jaw of the nut for a musical instrument in FIG. 1 is arranged in an open position.
Figure 6:
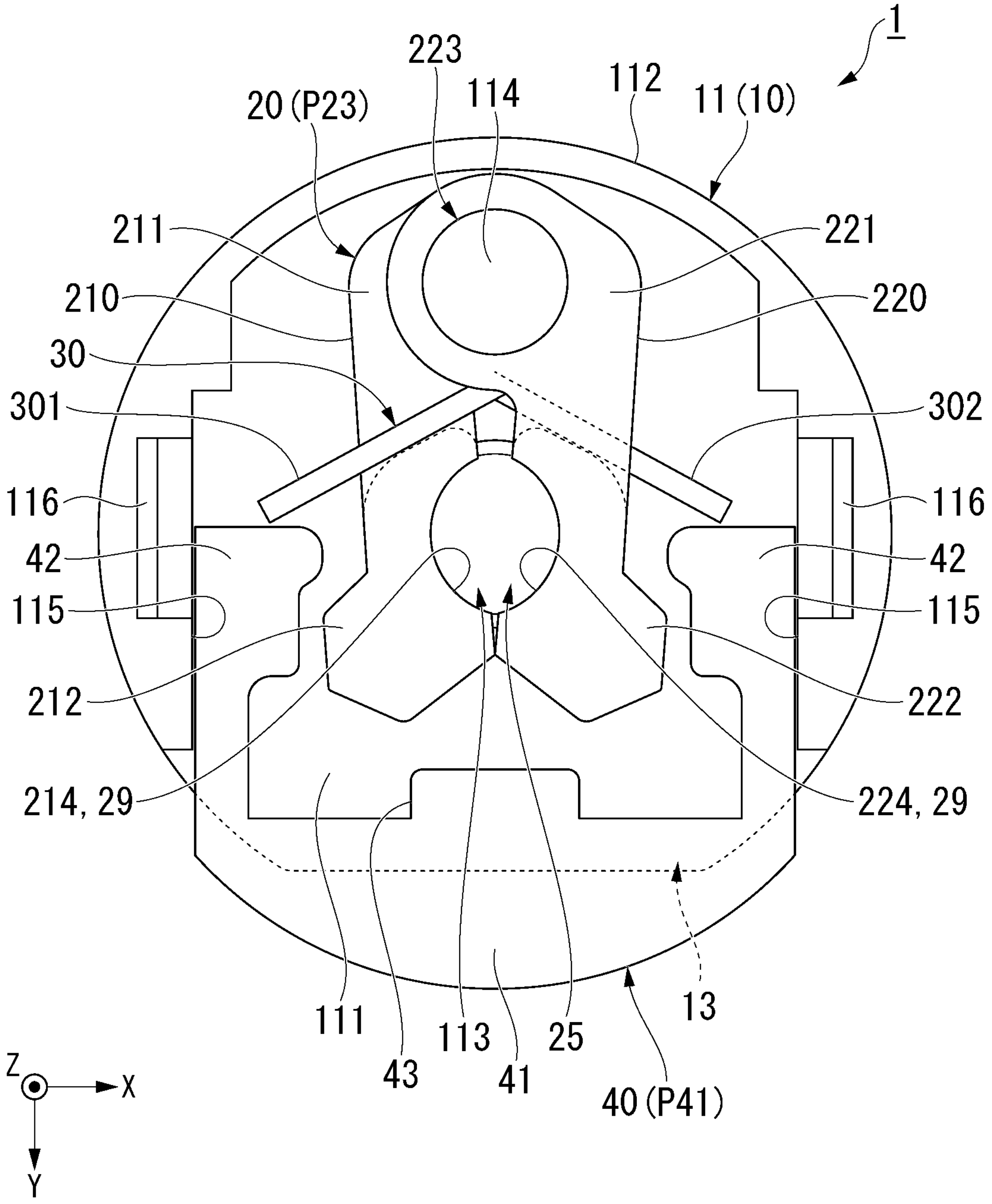
FIG. 6 is a plan view showing a state where the clamp jaw of the nut for a musical instrument in FIG. 1 is arranged in a rest position.

As shown in FIG. 4 to FIG. 6, the clamp jaw 20 includes an opening (opening portion) 25 for passing the front end portion 4 of the stand 2. The clamp jaw 20 changes the size of the opening 25 between a closed position P21 and an open position P22 in a state where the stand 2 has been passed through the opening 25.

As shown in FIG. 4, the closed position P21 is a position of the clamp jaw 20 in which the opening 25 is sufficiently small for the front end portion 4 of the stand 2 that has been passed through the opening 25 to make contact with the clamp jaw 20. As shown in FIG. 5, the open position P22 is a position of the clamp jaw 20 in which the opening 25 is sufficiently large to enable the front end portion 4 of the stand 2 to be passed through the opening 25 without making contact with the clamp jaw 20. As shown in FIG. 6, the clamp jaw 20 can also be positioned in a rest position P23, in which the size of the opening 25 becomes smaller than in the closed position P21 in a state where the stand 2 is not passing through the opening 25.

As shown in FIG. 3 to FIG. 6, the clamp jaw 20 of the present embodiment includes two parts 210 and 220 (a first part 210 and a second part 220). The two parts 210 and 220 are each attached to the rotation shaft 114 of the clamp jaw 20 provided in the housing 10. As a result of the two parts 210 and 220 being attached to the rotation shaft 114, the two parts 210 and 220 are each capable of rotating about the rotation shaft 114.

Specifically, the first end portions 211 and 221 of the two parts 210 and 220 have insertion holes 213 and 223 through which the rotation shaft 114 is inserted. The first end portions 211 and 221 of the two parts 210 and 220 are arranged so as to be aligned in the axial direction of the rotation shaft 114. The second end portions 212 and 222 of the two parts 210 and 220 are each positioned away from the rotation shaft 114, and are arranged so as to be aligned in the circumferential direction of the rotation shaft 114.

As shown in FIG. 4 to FIG. 6, the second end portions 212 and 222 of the two parts 210 and 220 constitute the opening 25 of the clamp jaw 20. The second end portions 212 and 222 of the two parts 210 and 220 have arc-shaped forming surfaces 214 and 224 that respectively constitute the inner circumferential surface of the opening 25. The female thread 29 of the nut 1 for a musical instrument is formed on the forming surfaces 214 and 224. When the two parts 210 and 220 are arranged inside the housing 10, the second end portions 212 and 222 of the two parts 210 and 220 are generally aligned in the second orthogonal direction between the two support surfaces 115 of the housing 10. Furthermore, the direction from the first end portions 211 and 221 of the parts 210 and 220 toward the second end portions 212 and 222 is generally toward the opening 13 side of the housing 10 (positive Y-axis direction in FIG. 4 to FIG. 6).

In the clamp jaw 20 of the present embodiment, movement of the two parts 210 and 220 such that the second end portions 212 and 222 of the two parts 210 and 220 move away from each other means that the clamp jaw 20 opens. Specifically, it means that the clamp jaw 20 moves from the rest position P23 to the closed position P21, or moves from the closed position P21 to the open position P22. Furthermore, movement of the two parts 210 and 220 such that the second end portions 212 and 222 of the two parts 210 and 220 move closer to each other means that the clamp jaw 20 closes. Specifically, it means that the clamp jaw 20 moves from the open position P22 to the closed position P21, or moves from the closed position P21 to the rest position P23.

In the closed position P21 and the open position P22, the second end portions 212 and 222 of the two parts 210 and 220 are positioned with a spacing between them. In the rest position P23, the second end portions 212 and 222 of the two parts 210 and 220 make contact with each other.

In the closed position P21, the elastic member 30 exerts a force directly on the clamp jaw 20, and clamps the clamp jaw 20 to the stand 2. The elastic member 30 exerts a force on the second end portions 212 and 222 of the two parts 210 and 220 such that the second end portions 212 and 222 of the two parts 210 and 220 of the clamp jaw 20 move closer to each other, that is to say, the size of the opening 25 becomes smaller.

As shown in FIG. 3, the elastic member 30 of the present embodiment is a torsion spring attached to the rotation shaft 114. The torsion spring is attached to the rotation shaft 114 such that it is positioned between the first end portions 211 and 221 of the two parts 210 and 220 of the clamp jaw 20 in the axial direction of the rotation shaft 114.

As shown in FIG. 4 and FIG. 6, in the closed position P21 and the rest position P23, the first end portion 301 in the longitudinal direction of the elastic member 30, which is a torsion spring, exerts a force on the second end portion 212 of the first part 210 of the clamp jaw 20, and presses the second end portion 212 of the first part 210 toward the second end portion 222 of the second part 220. Furthermore, the second end portion 302 in the longitudinal direction of the elastic member 30 exerts a force on the second end portion 222 of the second part 220 of the clamp jaw 20, and presses the second end portion 222 of the second part 220 toward the second end portion 212 of the first part 210.

The front end portions of the first end portion 301 and the second end portion 302 of the elastic member 30 project outside the clamp jaw 20 (specifically, the second end portions 212 and 222 of the two parts 210 and 220) in the second orthogonal direction.

As shown in FIG. 4 to FIG. 6, the operating element 40 changes the position of the clamp jaw 20 as a result of the user operating the nut 1 for a musical instrument. Specifically, the operating element 40 changes the position of the clamp jaw 20 from the rest position P23 or the closed position P21 to the open position P22 as a result of an operation by the user.

The operating element 40 is arranged such that a portion of the operating element 40 faces outward from the opening 13 of the housing 10 to enable operation by the user. Furthermore, the operating element 40 is provided so as to be movable with respect to the housing 10 in the first orthogonal direction within a range where it does not fall out from the opening 13 to the outside of the housing 10. The operating element 40 is movable in the first orthogonal direction between a first position P41 (see FIGS. 4 and 6), which regulates a movement of the clamp jaw 20 from the closed position P21 to the open position P22, and a second position P42 (see FIG. 5), which holds the clamp jaw 20 in the open position P22. The second position P42 of the operating element 40 is a position that is displaced further toward the inside of the housing 10 in the first orthogonal direction than the first position P41.

As shown in FIG. 3 to FIG. 6, the operating element 40 includes a base end portion 41, front end portions 42, and a pressing portion 43. The base end portion 41 of the operating element 40 is arranged so as to face outward from the opening 13 of the housing 10.

The front end portions 42 of the operating element 40 are integrally formed with the base end portion 41. The front end portions 42 extend, with respect to the base end portion 41, from the opening 13 of the housing 10 toward the inside of the housing 10 in the first orthogonal direction. The two front end portions 42 are arranged so that the second end portions 212 and 222 of the two parts 210 and 220 of the clamp jaw 20 are positioned between the second end portions 212 and 222 in the second orthogonal direction. The front end portions 42 are positioned between the second end portions 212 and 222 of the parts 210 and 220 of the clamp jaw 20 and the support surfaces 115 of the housing 10 in the second orthogonal direction.

As shown in FIG. 4 and FIG. 6, when the operating element 40 is arranged in the first position 41, the front end portions 42 block (regulate) the movement of the second end portions 212 and 222 of the parts 210 and 220 of the clamp jaw 20 from the closed position P21 to the open position P22 (see FIG. 5). The front end portions 42 do not block (regulate) the movement of the second end portions 212 and 222 of the parts 210 and 220 of the clamp jaw 20 between the closed position P21 and the rest position P23.

Specifically, when the operating element 40 is arranged in the first position P41, the front end portions 42 are sandwiched between the second end portions 212 and 222 of the parts 210 and 220 of the clamp jaw 20 arranged in the closed position P21, and the support surfaces 115 of the housing 10. As a result, the movement of the second end portions 212 and 222 of the parts 210 and 220 of the clamp jaw 20 from the closed position P21 to the open position P22 is blocked (regulated) by the front end portions 42. That is to say, in the closed position P21 shown in FIG. 4, the front end portions 42 make contact with the clamp jaw 20 and the housing 10 to hinder the clamp jaw 20 from opening.

As shown in FIG. 5, when the operating element 40 is arranged in the second position P42, the front end portions 42 allow the movement of the second end portions 212 and 222 of the parts 210 and 220 of the clamp jaw 20 from the closed position P21 (see FIG. 4) to the open position P22. Furthermore, when the operating element 40 is arranged in the second position P42, the two front end portions 42 each press the first end portion 301 and the second end portion 302 of the elastic member 30, and the force of the elastic member 30 exerted on the second end portions 212 and 222 of the parts 210 and 220 of the clamp jaw 20 is released. That is to say, the force of the elastic member 30 that closes the clamp jaw 20 is released.

As shown in FIG. 4 to FIG. 6, as with the front end portions 42, the pressing portion 43 of the operating element 40 is integrally formed with the base end portion 41. The pressing portion 43 protrudes, with respect to the base end portion 41, from the opening 13 of the housing 10 toward the inside of the housing 10 in the first orthogonal direction. The pressing portion 43 is arranged so as to be generally positioned between the second end portions 212 and 222 of the two parts 210 and 220 of the clamp jaw 20 in the second orthogonal direction. The dimension (length) of the pressing portion 43 in the second orthogonal direction is larger than the spacing between the second end portions 212 and 222 of the two parts 210 and 220 in the closed position P21.

When the operating element 40 is arranged in the first position P41, the pressing portion 43 is positioned away from the clamp jaw 20 (specifically, the second end portions 212 and 222 of the two parts 210 and 220).

As a result of the operating element 40 moving from the first position P41 to the second position P42, the pressing portion 43 enters between the second end portions 212 and 222 of the two parts 210 and 220 of the clamp jaw 20, presses and opens the clamp jaw 20 so as to widen the spacing between the second end portions 212 and 222 of the two parts 210 and 220, and positions the clamp jaw 20 in the open position P22. Consequently, in the open position P22 shown in FIG. 5, the pressing portion 43 presses and opens the clamp jaw 20.

As shown in FIG. 6, when the operating element 40 is arranged in the first position P41, and the stand 2 is not passing through the opening 25, the clamp jaw 20 is arranged in the rest position P23 by the elastic member 30. Specifically, the clamp jaw 20 is arranged in the rest position P23 as a result of the elastic member 30 pressing the second end portions 212 and 222 of the two parts 210 and 220 such that the second end portions 212 and 222 of the two parts 210 and 220 of the clamp jaw 20 move closer to each other. In the rest position P23, the clamp jaw 20 is separated from the operating element 40.

As shown in FIG. 3, the nut 1 for a musical instrument further includes a blocking structure (regulating structure) 60 that blocks (regulates) the movement of the operating element 40 so that the operating element 40 does not fall out to the outside of the housing 10. The blocking structure 60 has a stepped surface 61 formed on the housing 10, and a engaging portion 62 that is provided on the operating element 40 and engages with the stepped surface 61.

The stepped surface 61 of the housing 10 faces in the direction in which the operating element 40 moves from the first position P41 to the second position P42 in the first orthogonal direction (negative Y-axis direction). In the present embodiment, the stepped surface 61 is configured by a stepped portion 63 that protrudes in the one direction (positive Z-axis direction) from the edge of the bottom plate portion 111 that forms the opening 13 of the housing 10. The engaging portion 62 of the operating element 40 is positioned on the negative Y-axis direction side of the stepped surface 61.

For example, when the operating element 40 is arranged in the first position P41, the engaging portion 62 of the operating element 40 makes contact and engages with the stepped surface 61 of the housing 10. In this state, the operating element 40 cannot be moved toward the outside of the housing 10. That is to say, the operating element 40 can be prevented from falling out to the outside of the housing 10.

The engaging portion 62 of the operating element 40 may engage with the stepped surface 61 of the housing 10, for example, in a position where the operating element 40 has been moved further to the outside of the housing 10 (positive Y-axis direction) than the first position P41.

Next, an example of a usage method of the nut 1 for a musical instrument of the present embodiment will be described.

When the nut 1 for a musical instrument is not being used, that is to say, as shown in FIG. 6, when the front end portion 4 of the stand 2 is not passing through the opening 25 of the nut 1 for a musical instrument, the clamp jaw 20 is arranged in the rest position P23. In this state, the size of the opening 25 is sufficiently small to prevent the front end portion 4 of the stand 2 from passing through.

When the nut 1 for a musical instrument is attached to the front end portion 4 of the stand 2, as shown in FIG. 5, the operating element 40 is firstly moved from the first position P41 to the second position P42. The movement is performed as a result of the user of the nut 1 for a musical instrument pressing the base end portion 41 of the operating element 40 into the inside of the housing 10. Consequently, the front end portions 42 of the operating element 40 allow the movement of the clamp jaw 20 from the rest position P23 or the closed position P21 to the open position P22. Furthermore, the front end portions 42 of the operating element 40 press the first end portion 301 and the second end portion 302 of the elastic member 30, and the force of the elastic member 30 exerted on the clamp jaw 20 is released. In addition, the pressing portion 43 of the operating element 40 presses and opens the clamp jaw 20, and moves the clamp jaw 20 from the rest position P23 to the open position P22. When the operating element 40 is arranged in the second position P42, the clamp jaw 20 is held in the open position P22 by the pressing portion 43.

In this state, the front end portion 4 of the stand 2 is passed through the opening 25 of the nut 1 for a musical instrument.

After the front end portion 4 of the stand 2 has been passed through the opening 25 of the nut 1 for a musical instrument, then as shown in FIG. 4, the operating element 40 is moved from the second position P42 to the first position P41. At the time of the movement, the user of the nut 1 for a musical instrument simply needs to release the base end portion 41 of the operating element 40 to release the pressing of the operating element 40 into the inside of the housing 10. When the pressing of the operating element 40 by the user is released, the operating element 40 is moved to the first position P41 by the elastic member 30. When the operating element 40 is arranged in the first position P41, the clamp jaw 20 is held in the closed position P21 by the front end portions 42 of the operating element 40. Furthermore, the elastic member 30 exerts a force directly on the clamp jaw 20 to clamp the clamp jaw 20 to the stand 2. That is to say, the forming surfaces 214 and 224 of the clamp jaw 20 are pressed against the front end portion 4 of the stand 2 by the elastic member 30. Moreover, the female thread 29 of the clamp jaw 20 engages the male thread of the front end portion 4 of the stand 2.

As a result of the above, attachment of the nut 1 for a musical instrument to the stand 2 is completed.

When removing the nut 1 for a musical instrument from the front end portion 4 of the stand 2, the steps described above that are performed when attaching the nut 1 for a musical instrument to the stand 2 may be carried out in reverse order.

Because the nut 1 for a musical instrument does not need to be rotated with respect to the stand 2, it can be easily attached and detached with respect to the stand 2 in a short time.

As described above, the nut 1 for a musical instrument of the present embodiment has a mechanism in which the clamp jaw 20 is held in the closed position P21 by the front end portions 42 of the operating element 40. Furthermore, in the closed position P21, the elastic member 30 exerts a force directly on the clamp jaw 20 to clamp the clamp jaw 20 to the stand 2. Consequently, the frictional force acting between the clamp jaw 20 and the stand 2 increases. As a result, even if a direct or indirect impact is applied to the nut 1 for a musical instrument and the stand 2, it is possible to prevent the nut 1 for a musical instrument from becoming accidentally detached from the stand 2.

In the present embodiment, the female thread 29 of the clamp jaw 20 and the male thread of the stand 2 are engaged. However, as described above, because the frictional force acting between the clamp jaw 20 and the stand 2 is large, the nut 1 for a musical instrument can be prevented from rotating with respect to the stand 2. That is to say, it is possible to effectively prevent the nut 1 for a musical instrument from rotating and becoming detached from the stand 2.

Furthermore, in the nut 1 for a musical instrument of the present embodiment, the elastic member 30 is a torsion spring attached to the rotation shaft 114. As a result of attaching the elastic member 30 to the rotation shaft 114, the nut 1 for a musical instrument can be more compactly configured compared to a case where the elastic member 30 is attached to a position that is separate from the rotation shaft 114.

Moreover, in the nut 1 for a musical instrument of the present embodiment, the clamp jaw 20 is made of the two parts 210 and 220. The two parts 210 and 220 are each attached to the rotation shaft 114. As a result, the two parts 210 and 220 constituting the clamp jaw 20 are capable of rotating about the rotation shaft 114 independently of each other. Consequently, deterioration of the clamp jaw 20 can be suppressed compared to a case where the clamp jaw 20 is configured by a single part.

Second Embodiment

Next, a second embodiment of the present disclosure will be described with reference to FIG. 7 to FIG. 9. In the following description, the same reference symbols are given to the same configurations as those already described, and redundant descriptions will be omitted.

Figure 7:
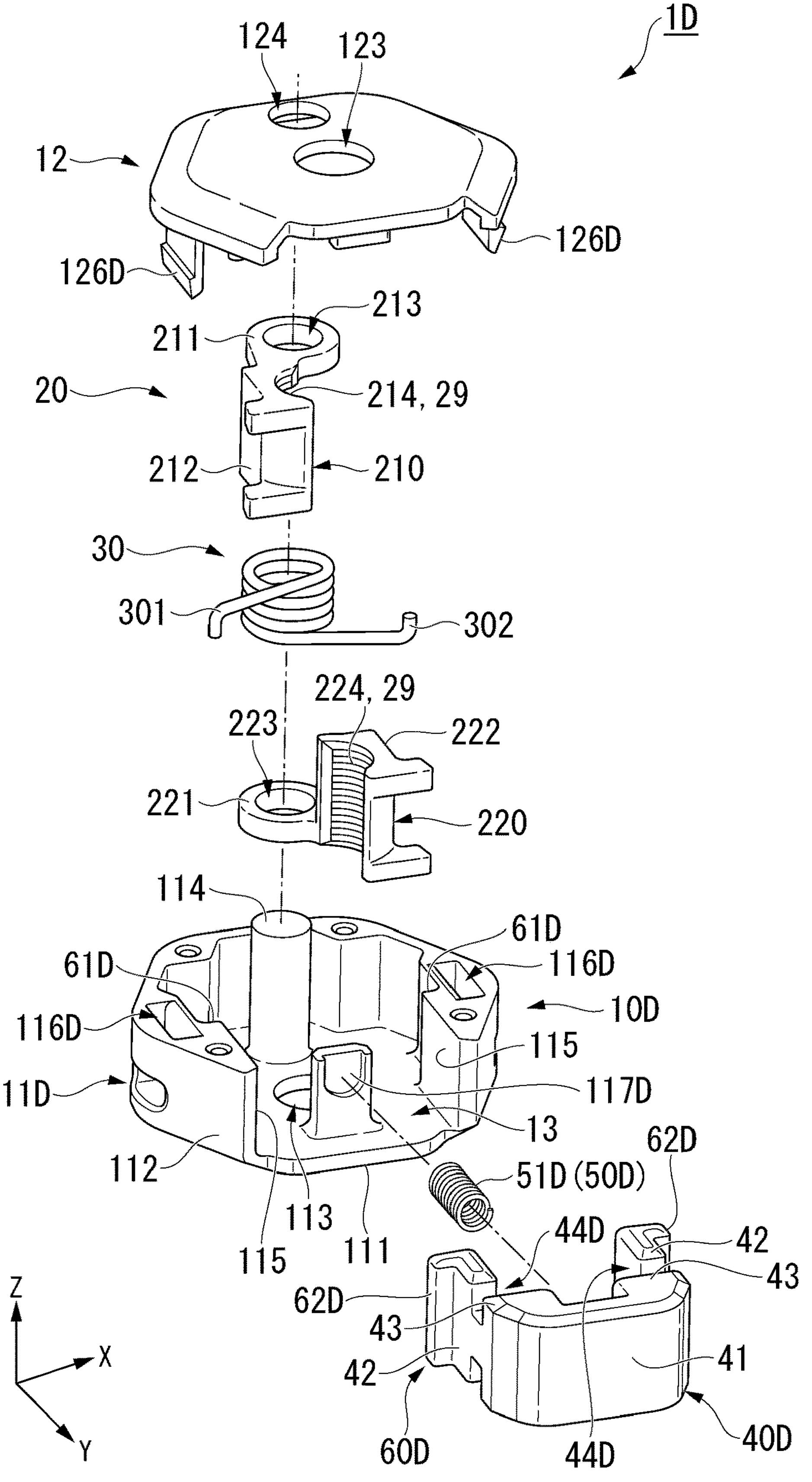
FIG. 7 is an exploded perspective view of a nut for a musical instrument of a second embodiment of the present disclosure.
Figure 8:
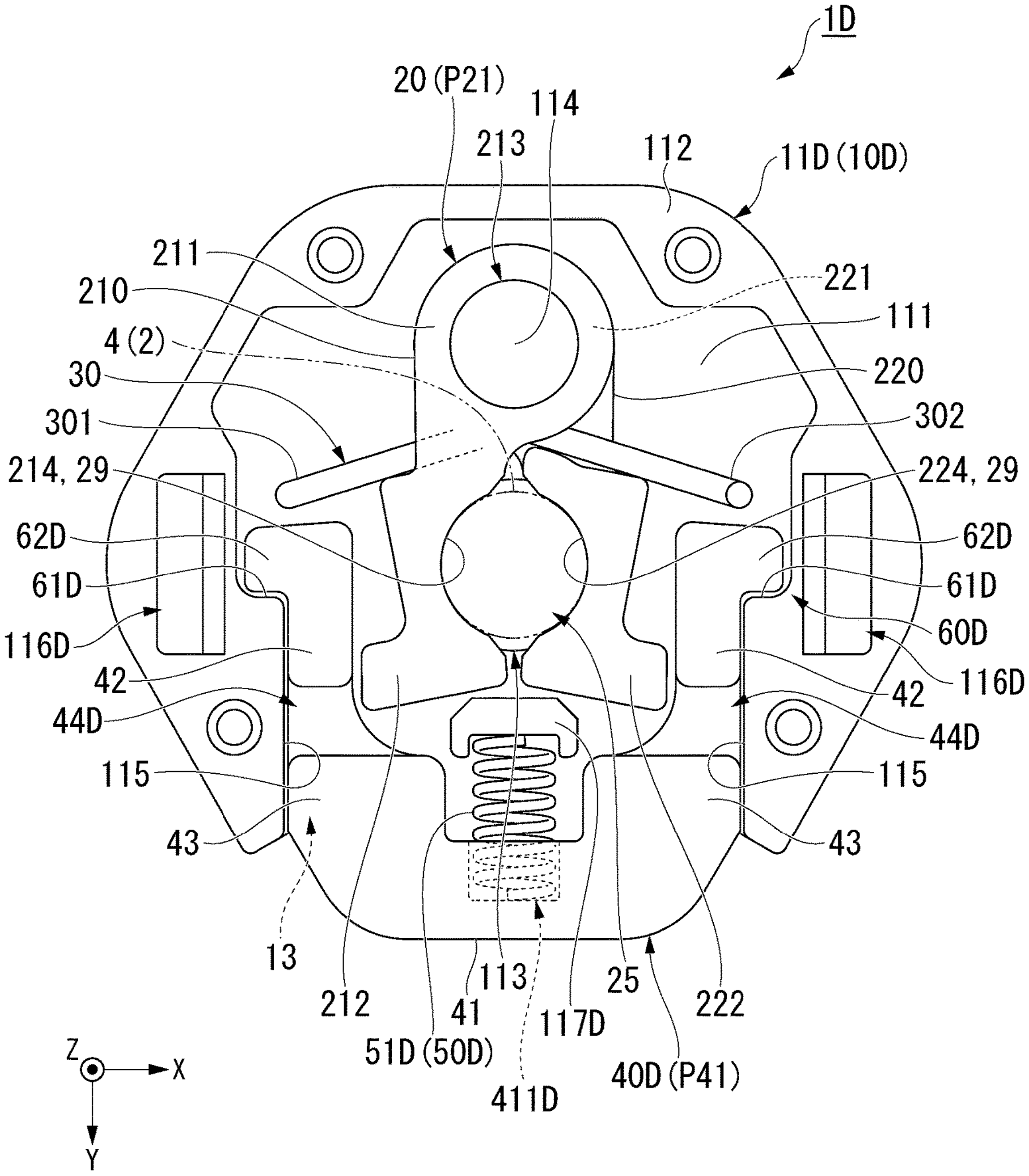
FIG. 8 is a plan view showing a state where the clamp jaw of the nut for a musical instrument in FIG. 7 is arranged in a closed position.
Figure 9:
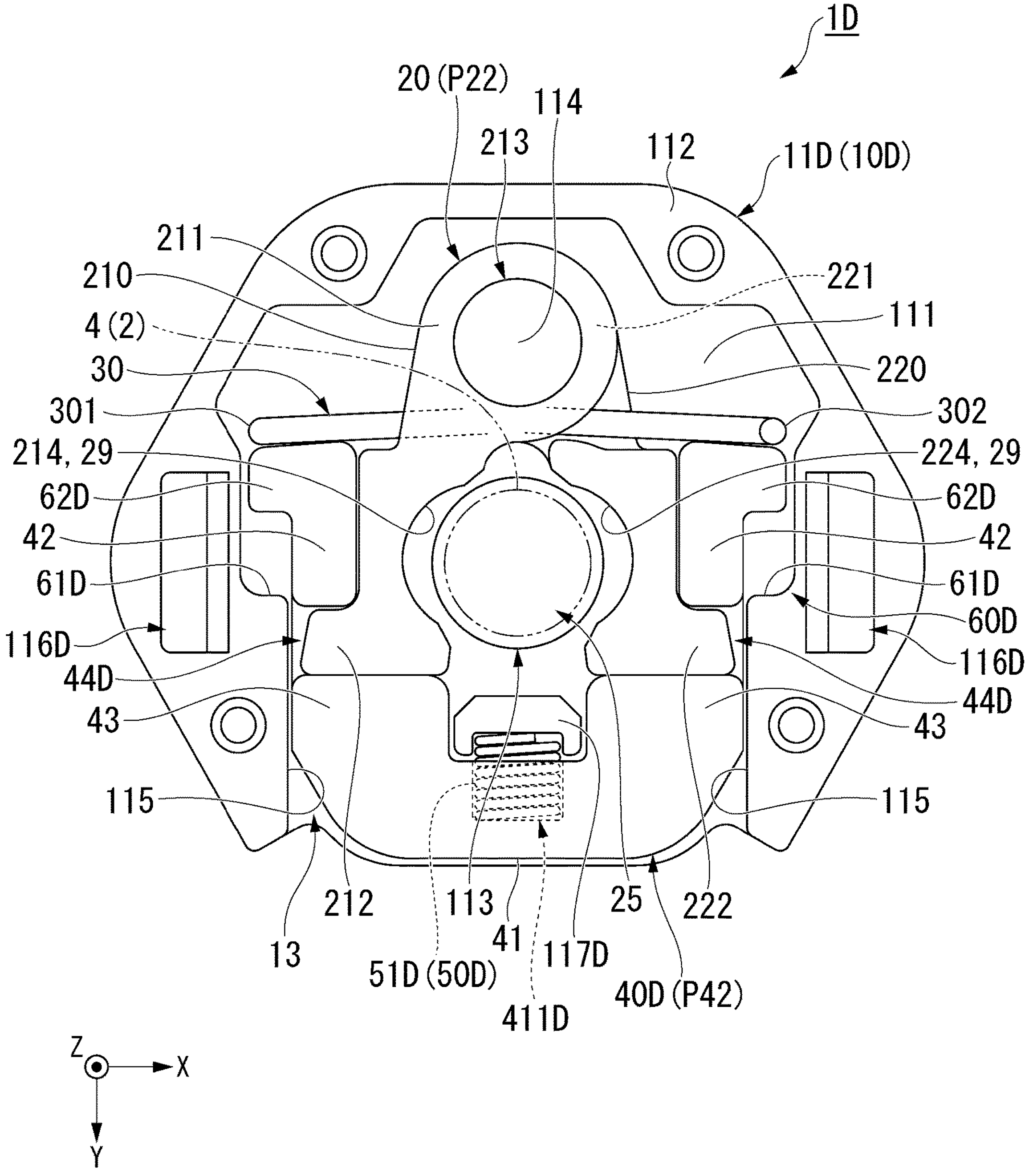
FIG. 9 is a plan view showing a state where the clamp jaw of the nut for a musical instrument in FIG. 7 is arranged in an open position.

As shown in FIG. 7 to FIG. 9, as with the first embodiment, the nut 1D for a musical instrument of the second embodiment includes a housing 10D, a clamp jaw 20, an elastic member 30, and an operating element 40D. Further, the nut 1D for a musical instrument of the second embodiment includes an elastic pressing member 50D.

The housing 10D of the second embodiment further includes a holding wall 117D. The holding wall 117D holds a first end portion of the elastic pressing member 51D described below. The holding wall 117D is positioned between the through holes 113 and 123 and the opening 13 of the housing 10D in the first orthogonal direction. In the second embodiment, the holding wall 117D is formed on the housing body 11D, and protrudes from the bottom plate portion 111 in the one direction (positive Z-axis direction). The holding wall 117D, for example, may also be formed on the lid 12. The holding wall 117D is arranged so as to be generally positioned between the second end portions 212 and 222 of the two parts 210 and 220 of the clamp jaw 20 in the second orthogonal direction.

In the housing 10D of the second embodiment, claw portions 126D is provided on the lid 12, and engaged portions 116D are formed. The engaged portions 116D cause the claw portions 126D to engage with the side wall portion 112 of the housing body 11D. The lid 12 is held by the housing body 11 as a result of the claw portions 126D of the lid 12 being engaged with the engaged portions 116D of the housing body 11D.

In the operating element 40D of the second embodiment, the base end portion 41 includes a holding portion 411D that holds a second end portion of the elastic pressing member 51D described below. The holding portion 411D of the operating element 40D is provided in a position of the base end portion 41 that faces the holding wall 117D mentioned above in the first orthogonal direction, among the front end portion 41. In the present embodiment, the holding portion 411D is a concave portion that accommodates the second end portion of the elastic pressing member 51D. As with the holding wall 117D of the housing 10D, the holding portion 411D is arranged so as to be generally positioned between the second end portions 212 and 222 of the two parts 210 and 220 of the clamp jaw 20 in the second orthogonal direction.

In the operating element 40D of the second embodiment, pressing portions 43 are positioned on both sides of the holding portion 411D in the second orthogonal direction so as to not interfere with the elastic pressing member 50D. The two pressing portions 43 are each positioned facing the second end portions 212 and 222 of the two parts 210 and 220 of the clamp jaw 20 in the first orthogonal direction. As a result of the operating element 40D moving from the first position P41 to the second position P42, the two pressing portions 43 press the second end portions 212 and 222 of the parts 210 and 220 so as to widen the spacing between the second end portions 212 and 222 of the two parts 210 and 220. That is to say, as with the first embodiment, the two pressing portions 43 press and open the clamp jaw 20 and position it in the open position P22.

In the operating element 40D of the second embodiment, recesses 44D are formed between the base end portion 41 and the front end portions 42. The second end portions 212 and 222 of the parts 210 and 220 of the clamp jaw 20 are inserted into the recesses 44D when the clamp jaw 20 moves to the open position P22 along with the movement of the operating element 40D from the first position P41 to the second position P42 (specifically, see FIG. 9).

The elastic pressing member 50D elastically presses the operating element 40D from the second position P42 side to the first position P41 with respect to the housing 10D. In the present embodiment, the elastic pressing member 50D is the elastic pressing member 51D that is arranged so as to be sandwiched between the holding wall 117D of the housing 10D and the holding portion 411D of the operating element 40D, which are aligned in the first orthogonal direction. The elastic pressing member 51D is provided so as to at least generate an elastic force that presses the operating element 40D when the operating element 40D is positioned further toward the second position P42 side than the first position P41.

The elastic pressing member 50D of the present embodiment is a coil spring. The coil spring is arranged so that its axial direction faces the first orthogonal direction. A first end portion of the coil spring is held by the holding wall 117D of the housing 10D, and a second end portion of the coil spring is held by the holding portion 411D of the operating element 40D.

The nut 1D for a musical instrument of the second embodiment includes the same blocking structure 60D as the first embodiment. The blocking structure 60D includes, as with the first embodiment, stepped surfaces 61D formed on the housing 10D, and engaging portions 62D of the operating element 40D.

However, in the blocking structure 60D of the second embodiment, the stepped surfaces 61D of the housing 10D are formed on the side wall portion 112 of the housing body 11D, and are positioned on both sides of the operating element 40D in the second orthogonal direction. Specifically, the stepped surfaces 61D are formed so as to be continuous with the end portions of the support surfaces 115 positioned inside the housing 10D in the first orthogonal direction.

On the other hand, the engaging portions 62D of the operating element 40D are provided on the two front end portions 42. The engaging portions 62D protrude to the outside of the operating element 40D in the second orthogonal direction, and are positioned further inside the housing 10D in the first orthogonal direction than the support surfaces 115 of the housing 10D. As a result, the engaging portions 62D face the stepped surfaces 61D of the housing 10D in the first orthogonal direction.

As shown in FIG. 8, when the operating element 40D is arranged in the first position P41, the engaging portions 62D of the operating element 40D make contact and lock with the stepped surfaces 61D of the housing 10D. In this state, the operating element 40D cannot be moved toward the outside of the housing 10D. That is to say, the operating element 40D can be prevented from falling out to the outside of the housing 10D.

The engaging portions 62D of the operating element 40D may be engaged with the stepped surfaces 61D of the housing 10D, for example, in a position where the operating element 40D has been moved further to the outside of the housing 10D (positive Y-axis direction) than the first position P41.

According to the nut 1D for a musical instrument of the second embodiment, the same effects as those of the first embodiment can be obtained.

Furthermore, the nut 1D for a musical instrument of the second embodiment further includes the elastic pressing member 50D which elastically presses the operating element 40D from the second position P42 side to the first position P41. As a result, the user of the nut 1 for a musical instrument is able to simply release the operating element 40D after moving the operating element 40D to the second position 42 to return the operating element 40D to the first position P41 due to the elastic force of the elastic pressing member 50D. That is to say, the clamp jaw can be easily and reliably returned from the open position P22 to the closed position P21 (or the rest position P23).

In addition, in the nut 1D for a musical instrument of the second embodiment, the elastic pressing member 50D elastically presses the operator 40D from the second position P42 side to the first position P41, so that unexpected movement of the operator 40D with respect to the housing 10D in the direction from the first position P41 toward the second position P42 can be suppressed or prevented. As a result, the generation of unnecessary noise from the nut 1D for a musical instrument due to the operator 40D unexpectedly moving relative to the housing 10D (for example, the sound of the operator 40D hitting the housing 10D, the clamp jaw 20, the elastic member 30, etc.) can be effectively suppressed.

Third Embodiment

Next, a third embodiment of the present disclosure will be described with reference to FIG. 10 and FIG. 11. In the following description, the same reference symbols are given to the same configurations as those already described, and redundant descriptions will be omitted.

Figure 10:
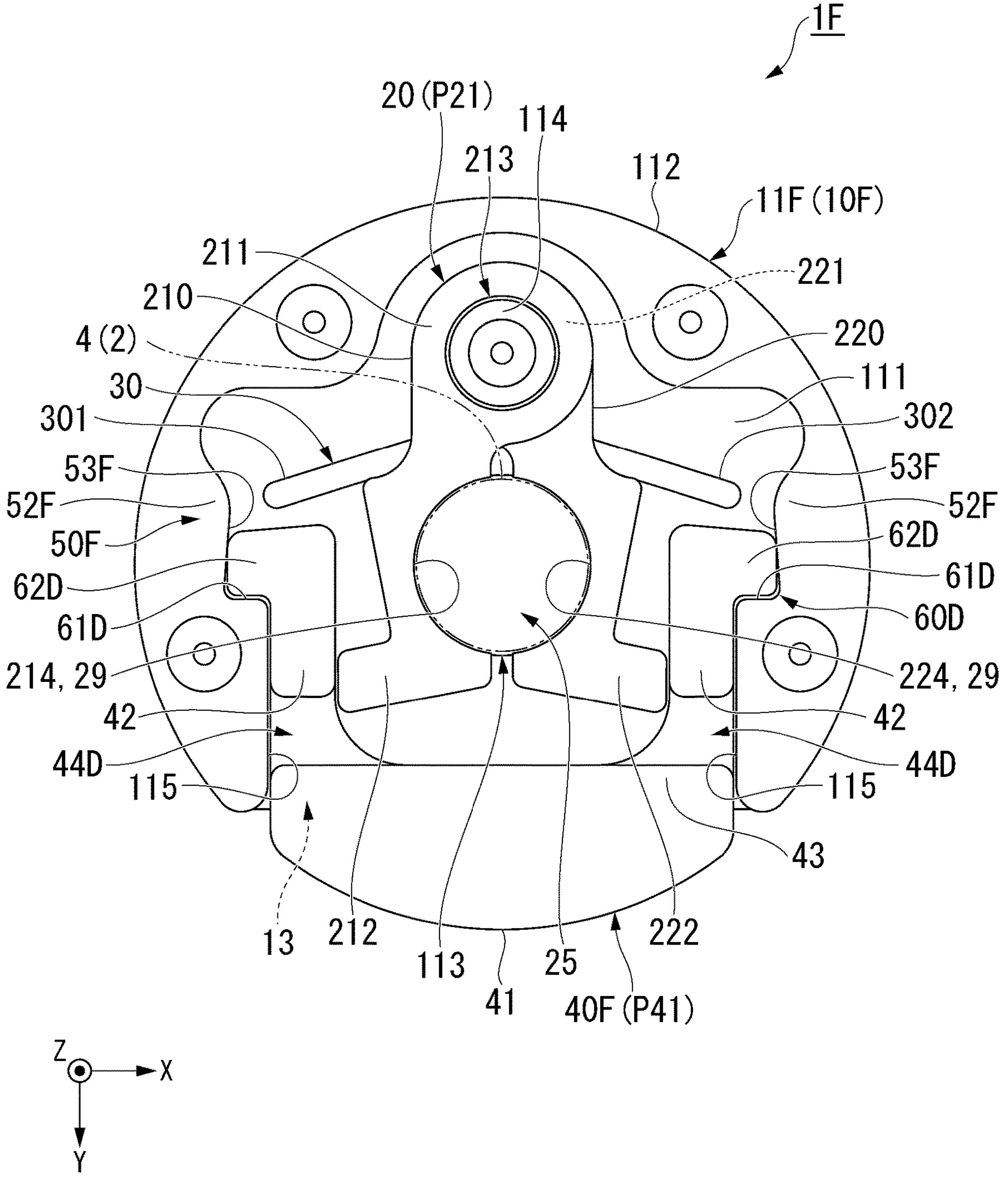
FIG. 10 is a plan view showing a state where the clamp jaw of the nut for a musical instrument according to a third embodiment of the present invention is arranged in a closed position.
Figure 11:
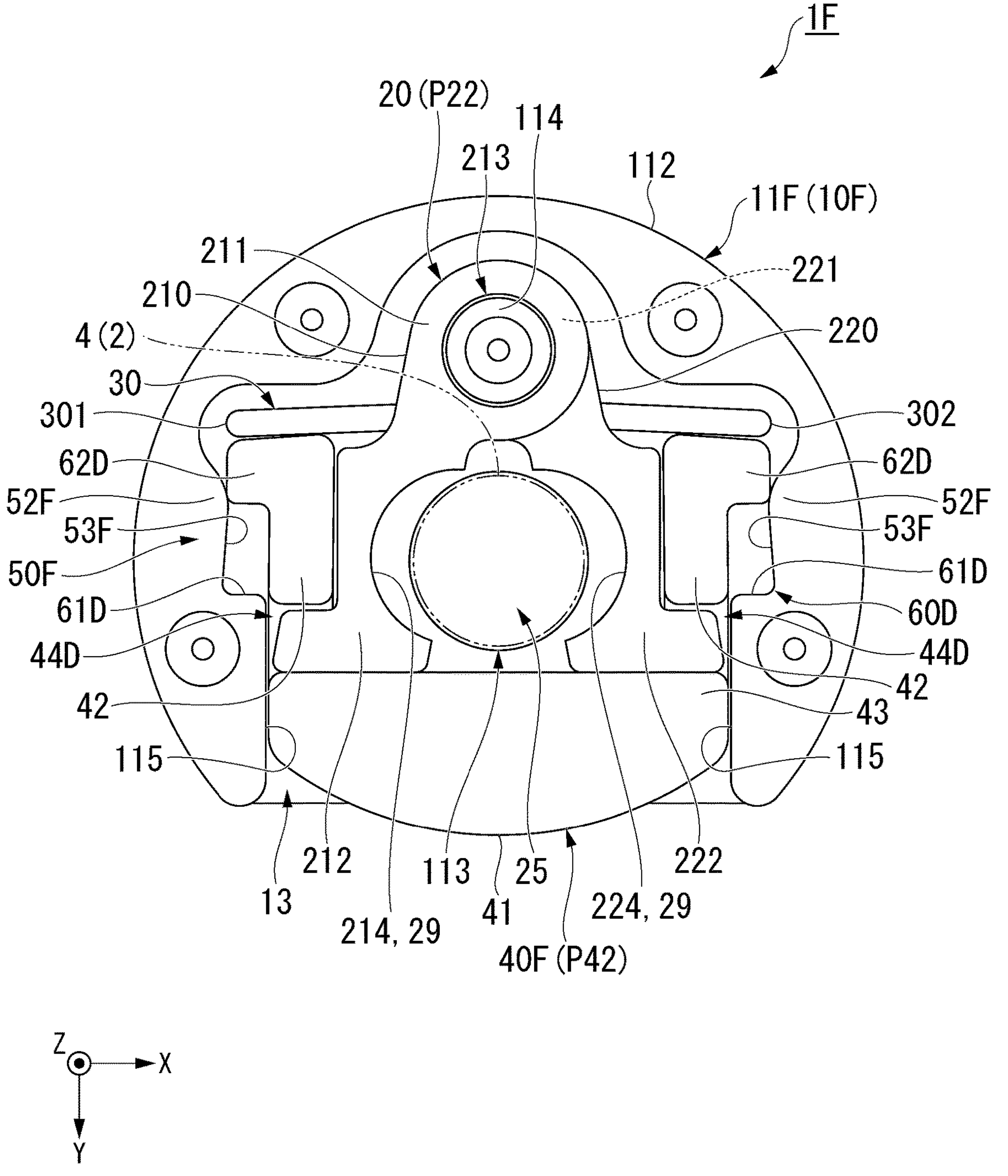
FIG. 11 is a plan view showing a state where the clamp jaw of the nut for a musical instrument of FIG. 10 is arranged in an open position.

As shown in FIG. 10 and FIG. 11, a nut 1F for a musical instrument of the third embodiment includes a housing 10F, a clamp jaw 20, an elastic member 30, an operator 40F, an elastic pressing member 50F, and a regulating structure 60D.

The housing 10F of the third embodiment is generally configured similarly to the housing 10D of the second embodiment, except that it does not have the holding wall 117D (see FIG. 7 to FIG. 9). Further, in the housing 10F of the third embodiment, the lid 12 (see FIG. 3 and FIG. 7, etc.) is attached to a housing body 11F by screw fastening. For this reason, the housing body 11F is not provided with the claw portions 116 (see FIG. 3) as in the first embodiment, and the engaged portions 116D (see FIG. 7) as in the second embodiment.

Except that the operator 40F of the third embodiment does not have the holding portion 411D (see FIG. 8 and FIG. 9), and the number of the pressing portions 43 is one, the configuration is generally similar to that of the operator 40D of the second embodiment.

The elastic pressing member 50F, as with the elastic pressing member 50D of the second embodiment, elastically presses the operator 40F from the second position P42 side to the first position P41 with respect to the housing 10F. However, the elastic pressing member 50F of the third embodiment has the operator 40F, and the convex portions 52F provided on the inner surface of the housing 10F.

In the operator 40F of the third embodiment that constitutes the elastic pressing member 50F, the front end portions 42 are elastically bendable and deformable with respect to the pressing portion 43 (base end portion 41). In the operator 40F shown in FIG. 10 and FIG. 11, the two front end portions 42 are each elastically bent and deformed so as to move in the second orthogonal direction with respect to the pressing portion 43.

The convex portions 52F are integrally formed with the housing 10F. The convex portions 52F are positioned in the direction (Y-axis negative direction) in which the operator 40F is directed from the first position P41 to the second position P42 with respect to the front end portions 42 of the operator 40F arranged at the first position P41. As a result, the convex portions 52F press the front end portions 42 to elastically bend and deform as the operator 40F moves from the first position P41 toward the second position P42. Then, in the elastic pressing member 50F, the operator 40F is elastically pressed from the second position P42 side to the first position P41 by the elastic force of the bending deformation of the front end portions 42.

The convex portions 52F have inclined surfaces 53F that are inclined with respect to the direction in which the operator 40F moves from the first position P41 to the second position P42. The inclined surfaces 53F face the front end portions 42 located at the first position P41 in the first orthogonal direction. Accordingly, as the operator 40F moves from the first position P41 toward the second position P42, the front end portions 42 are pushed by the inclined surfaces 53F of the convex portions 52F and are gradually elastically bent and deformed.

Further, in the nut 1F for a musical instrument of the third embodiment, the front end portions 42 contact the inclined surfaces 53F of the convex portions 52F when the operator 40F is positioned at the first position P41. Thereby, the operating element 40F can be held at the first position P41 by the inclined surfaces 53F.

When the operator 40F is positioned at the first position P41, then for example, the front end portions 42 may be elastically bent and deformed by contacting the inclined surfaces 53F. In this case, the operator 40F can be more reliably held at the first position P41 by the elastic force of the bending deformation of the front end portions 42.

Specifically, the convex portions 52F are positioned on both sides of the operator 40F in the second orthogonal direction so as to respectively correspond to the two front end portions 42 of the operator 40F. Each convex portion 52F is positioned on the inner surface of the side wall portion 112 of the housing body 11F, in the first orthogonal direction on opposite sides of the support surface 115 with respect to the stepped surface 61D. That is, the convex portions 52F are located inside the housing 10F in the first orthogonal direction from the stepped surfaces 61D. Further, in a state where the operator 40F is arranged at the first position P41, the engaging portions 62D provided on each front end portion 42, face the convex portions 52F in the first orthogonal direction. As a result, when the operator 40F is moved from the first position P41 toward the second position P42, the engaging portions 62D of the two front end portions 42 of the operator 40F are pressed by the convex portions 52F, and are elastically bent and deformed relative to the pressing portion 43 so as to approach each other in the second orthogonal direction.

As shown in FIG. 11, in the nut 1F for a musical instrument of the third embodiment, when the operator 40F reaches the second position P42, the front end portions 42 (engaging portions 62D) of the operator 40F are pressed by the convex portions 52F, and deformed elastically. However, in this state, the convex portions 52F are not positioned with respect to the front end portions 42 in the direction in which the operator 40F moves from the first position P41 to the second position P42. Further, in this state, the front end portions 42 of the operator 40F do not come into contact with the inclined surfaces 53F of the convex portions 52F. Therefore, the operator 40F is not elastically pushed from the second position P42 toward the first position P41 by the elastic force of the bending deformation of the front end portions 42.

However, in the nut 1F for a musical instrument of the third embodiment, similarly to the first and second embodiments, when the operator 40F is arranged in the second position P42, the first end 301 and the second end 302 of the elastic member 30 are pressed by the front end portions 42 of the operator, and the elastic member 30 is elastically deformed. Therefore, the elastic force of the elastic member 30 presses the operator 40F from the second position P42 toward the first position P41. Therefore, the elastic force of the elastic member 30 can press the operator 40F from the second position P42 to a position where the operator 40F is elastically pushed toward the first position P41 by the elastic force of the bending deformation of the front end portions 42.

According to the nut 1F for a musical instrument of the third embodiment, the same effects as the second embodiment are achieved. That is, the nut 1F for a musical instrument of the third embodiment includes the elastic pressing member 50F that elastically presses the operator 40F from the second position P42 side to the first position P41. As a result, the user of the nut 1F for a musical instrument simply releases the hand from the operator 40F after moving the operator 40F to the second position P42, so that the operator 40F can return to the first position P41 by the elastic force of the elastic pressing member 50F. That is, the clamp jaw 20 can be easily and reliably returned from the open position P22 to the closed position P21 (or the rest position P23). In addition, it is possible to suppress or prevent the operator 40F from unexpectedly moving from the first position P41 toward the second position P42 with respect to the housing 10F.

In addition, in the nut 1F for a musical instrument of the third embodiment, the elastic pressing member 50F is configured by the operator 40F and the projections 52F provided on the housing 10F. That is, it is possible to realize a structure for returning the operator 40F to the first position P41 without increasing the number of parts of the nut 1F for a musical instrument. Therefore, it is possible to improve the ease of assembly of the nut 1F for a musical instrument having a structure for returning the operator 40F to the first position P41, and also to reduce the manufacturing cost of the nut 1F for a musical instrument.

Furthermore, in the nut 1F for a musical instrument of the third embodiment, the front end portions 42 of the operator 40F contact the convex portions 52F. Thereby, the operator 40F can be held at the first position P41. Therefore, it is possible to further suppress the operator 40F from unexpectedly moving from the first position P41 toward the second position P42.

In addition, in the nut 1F for a musical instrument of the third embodiment, when the operator 40F is positioned at the first position P41, the front end portions 42 are brought into contact with the inclined surfaces 53F of the convex portions 52F, so that the front end portions 42 can also be elastically bent and deformed. As a result, the operator 40F can be more reliably held at the first position P41 by the elastic force of the bending deformation of the front end portions 42. Therefore, it is possible to more effectively suppress the operator 40F from unexpectedly moving from the first position P41 toward the second position P42.

In the third embodiment, even in the condition where the operator 40F is positioned at the second position P42, for example, the projections 52F allow the operator 40F to be positioned in a direction (Y-axis negative direction) from the first position P41 toward the second position with respect to the front end portions 42 of the operator 40F. In this case, even if the operator 40F is positioned at the second position P42, the operator 40F can be pushed elastically from the second position P42 toward the first position P41 by the elastic force of the bending deformation of the front end portions 42 pushed by the convex portions 52F.

The present disclosure has been described in detail above. However, the present disclosure is not limited to the embodiments above, and various changes may be applied within a scope not departing from the spirit of the present disclosure.

In the present disclosure, the first part 210 and the second part 220 constituting the clamp jaw 20 may, for example, be integrally formed. That is to say, the clamp jaw 20 may be configured by a single part. In this case, the clamp jaw 20 may be formed so as to be flexibly deformable so that the first part 210 and the second part 220 move toward and away from each other.

In the nut for a musical instrument of the present disclosure, the structure for attaching the lid 12 to the housing body is not limited to the claw portions and engaged portions as in the first and second embodiments, and the screw fastening as in the third embodiment, and may involve some other structure.

According to the present disclosure, it is possible to prevent accidental detachment from a stand, while also including a mechanism that holds a clamp jaw in a closed position by means of an operating element.

What is claimed is:

1. A nut for a musical instrument, comprising:

a clamp jaw having an opening through which a stand is passable, the clamp jaw being configured to, in a state of the stand being disposed in the opening, change a size of the opening by changing a position of the clamp jaw between an open position and a closed position;

an elastic member configured to, in a state of the clamp jaw being in the closed position, clamp the clamp jaw to the stand by exerting a force directly on the clamp jaw;

an operating element having a pressing portion and a front end portion; and a housing accommodating the clamp jaw, the elastic member, and the operating element, wherein in the state of the clamp jaw being in the closed position, the front end portion of the operating element hinders the clamp jaw from moving to the open position by contacting the clamp jaw and the housing, and wherein in a state of the clamp jaw being in the open position, the front end portion of the operating element presses the elastic member such that the elastic member does not exert the force directly on the clamp jaw and the pressing portion of the operating element presses and spreads the clamp jaw open.

2. The nut for a musical instrument according to claim 1, wherein the elastic member includes a torsion spring attached to a shaft disposed in the housing.

3. The nut for a musical instrument according to claim 1, wherein the clamp jaw includes a first part and a second part, each of the first part and the second part being attached to a shaft disposed in the housing.

4. The nut for a musical instrument according to claim 1, wherein the elastic member hinders rotation of the nut with respect to the stand disposed in the opening by exerting the force directly on the clamp jaw in the state of the clamp jaw being in the closed position.

5. The nut for a musical instrument according to claim 1, wherein in a state where the stand is not disposed in the opening, the clamp jaw is in a rest position in which the clamp jaw is spaced apart from the operating element, and a size of the opening when the clamp jaw is in the rest position is smaller than the size of the opening in the state where the clamp jaw is in the closed position.

6. The nut for a musical instrument according to claim 1, wherein:

the operating element is movable between a first position and a second position, in a state of the operating element being in the first position, the operating element blocks a movement of the clamp jaw from the closed position to the open position, in a state of the operating element being in the second position, the operating element holds the clamp jaw in the open position, and the nut further comprises an elastic pressing member that generates an elastic force configured to cause the operating element to move from the second position to the first position.

7. The nut for a musical instrument according to claim 6, wherein the elastic pressing member includes the operator and a convex portion that is provided on an inner surface of the housing, the front end portion of the operator is elastically bendable and deformable with respect to the pressing portion, the convex portion is positioned in a direction from the first position to the second position with respect to the front end portion of the operator arranged at the first position, so that the convex portion presses the front end portion to elastically bend and deform as the operator moves from the first position toward the second position, and the operator is elastically pushed from the second position side to the first position by an elastic force of bending deformation of the front end portion.

* * * * *